United States Patent Office 2,889,309
Patented June 2, 1959

2,889,309

COATING COMPOSITIONS

Howard M. Teeter, Wilma J. Schneider, and Lyle E. Gast, Peoria, Ill., assignors to the United States of America as represented by the Secretary of Agriculture No Drawing. Application October 15, 1956
Serial No. 616,111

2 Claims. (Cl. 260—45.9)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

Our copending application, Serial No. 616,110, filed October 15, 1956, discloses coating compositions comprising a vehicle, a film-forming ingredient, and a dryer, in particular the use of homopolymers of vinyl ethers of long-chain polyunsaturated fatty alcohols as the film-forming ingredient.

The vinyl ethers of that application have the structural formula (Linoleyl) OCH=CH$_2$
(Linolenyl) OCH=CH$_2$ or they are the vinyl ethers of the mixed polyunsaturated fatty alcohols obtained by reduction of soybean oil, linseed oil, safflower oil and other drying and semidrying vegetable oils. Alkali stability of a protective coating is an important and desirable property. While the protective coatings described in our copending application show good to excellent stability to alkali the ultimate stability to alkali achieved is not as high as would be expected from a polymer containing no saponifiable linkages, such as ester linkages. Although some of the films will resist the action of 5 percent alkali for several hours, many films ultimately dissolve completely in aqueous sodium hydroxide solutions. Investigation of the solutions of these films has disclosed that one product of the degradation is a fatty acid having a neutral equal to that of an 18-carbon-atom fatty acid. No evidence is obtained that alkali solubility of these films is due to depolymerization of the polymer. This is evident because the initial vinyl ether, for example, the vinyl ether of soybean alcohols, is not soluble in alkali nor is the alcohol from which the ether was obtained nor are any of the polymers that may be prepared from the aforesaid soybean vinyl ether.

It is known that alkyl vinyl ether polymers undergo on standing a degradation to lower polymers, alcohols and aldehydes. This degradation is believed to be a depolymerization due to traces of the catalyst originally used for polymerization remaining in the polymer. Conventional anti-oxidants are known to prevent this breakdown. See for example the paper by George et al., Journal of the American Chemical Society 72, 3900 (1950).

Even though the degradative charges that take place in the protective coating composition prepared from a polyunsaturated vinyl ether polymer are not of the same type as those undergone by saturated alkyl vinyl ether polymers, as is shown by the difference in the degradation products obtained, we have discovered that certain antioxidants such as hydroquinone, phenyl β-naphthylamine and naphthylamine can be used to prevent the degradative changes that occur in a protective coating prepared from an unsaturated vinyl ether polymer. We have further found that this action of the antioxidant does not substantially interfere with the normal antioxidation catalyzed by metallic dryers that is required to produce cross-linking between the polyunsaturated fatty side chains in the polymer and that is required to permit the formation of a dry film. The stabilizing effect of the antioxidants mentioned appears to have its maximum value when lead metal is used as the dryer. Furthermore, improvement in the color of the resulting films is obtained. Properly prepared films containing one of the aforementioned antioxidants and lead as a metallic dryer are essentially unaffected by indefinite immersion in a 5 percent aqueous solution of sodium hydroxide as determined by visual inspection.

Our invention substantially increases the utility of polymers of polyunsaturated vinyl ethers as protective coating materials by permitting the inherent alkali stability of the ether linkage to be realized more fully.

The following specific examples illustrate our invention:

*Example 1*

To a solution of 1 gram of a polymer of the vinyl ether of soybean alcohol in toluene, as the vehicle, is added 0.4 percent of lead as lead naphthenate, as the dryer, and 1 percent of phenyl β-naphthylamine as the antioxidant. Films are cast on glass from this solution and baked for one hour at 150° C. A colorless dry film is obtained which is unaffected by immersion for indefinite periods of time in excess of 24 hours in a 5 percent solution of sodium hydroxide as determined by visual inspection of the films.

*Example 2*

A protective coating composition is prepared as in Example 1 except that 1 percent of hydroquinone is used instead of the phenyl β-naphthylamine. By baking for 1 hour at 150° a colorless dry film is obtained that is harder than the one containing phenyl β-naphthylamine. This film may swell slightly but is essentially unaffected by prolonged immersion in excess of 24 hours in a 5 percent aqueous solution of sodium hydroxide as determined by visual inspection of the films.

*Example 3*

A protective coating composition is prepared as in Example 1, except that 1 percent of β-naphthylamine is used instead of the phenyl β-naphthylamine. By baking at 150° C. a colorless dry film is obtained. This film is unaffected by prolonged immersion in excess of 24 hours in a 5 percent aqueous solution of sodium hydroxide as determined by visual inspection of the films.

Having thus described our invention what we claim is:

1. A protective coating composition comprising a vehicle, a dryer, a film-forming ingredient consisting essentially of homopolymers of vinyl ethers of polyunsaturated fatty alcohols, said film-forming ingredient being selected from the group consisting of homopolymers of (Linoleyl) OCH=CH$_2$
(Linolenyl) OCH=CH$_2$ and homopolymers of the vinyl ethers of the mixed polyunsaturated fatty alcohols obtained by reduction of drying and semidrying vegetable oils, said homopolymers being polymerized predominately by linking of the vinyl groups, the unsaturation originally present in the fatty alcohol being substantially present in the homopolymer, and, as an antioxidant to prevent oxidative degradation of the main vinyl polymer chain in the polymer, a compound selected from the group consisting of hydroquinone, phenyl β-naphthylamine and β-naphthylamine.

2. The protective coating composition of claim 1 in which the dryer is lead naphthenate.

References Cited in the file of this patent

UNITED STATES PATENTS

| | | |
|---|---|---|
| 2,104,001 | Reppe et al. | Dec. 28, 1937 |
| 2,697,084 | Eger | Dec. 14, 1954 |

FOREIGN PATENTS

| | | |
|---|---|---|
| 465,348 | Great Britain | May 3, 1937 |
| 823,151 | France | Jan. 15, 1938 |

OTHER REFERENCES

Payne: "Organic Coating Technology," vol. 1 (1954), Wiley & Sons, New York, pages 228 and 238. (Copy in Division 50.)

UNITED STATES PATENT OFFICE

CERTIFICATE OF CORRECTION

Patent No. 2,889,309                                         June 2, 1959

Howard M. Teeter et al.

It is hereby certified that error appears in the printed specification of the above numbered patent requiring correction and that the said Letters Patent should read as corrected below.

Column 1, line 46, after "neutral" insert -- equivalent --; line 63, for "charges" read -- changes --; column 2, lines 2 and 3, for "antioxidation" read -- autoxidation --.

Signed and sealed this 13th day of October 1959.

(SEAL)
Attest:

KARL H. AXLINE                                        ROBERT C. WATSON
Attesting Officer                                    Commissioner of Patents